(12) United States Patent
Terazono et al.

(10) Patent No.: US 10,587,722 B2
(45) Date of Patent: Mar. 10, 2020

(54) INFORMATION PROCESSING DEVICE, METHOD OF TRANSMITTING CONTENT DATA, AND NON-TRANSITORY COMPUTER-READABLE STORAGE MEDIUM

(71) Applicant: FUJITSU LIMITED, Kawasaki-shi, Kanagawa (JP)

(72) Inventors: Kohei Terazono, Hadano (JP); Satoshi Iwata, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 15/382,900

(22) Filed: Dec. 19, 2016

(65) Prior Publication Data
US 2017/0257457 A1   Sep. 7, 2017

(30) Foreign Application Priority Data
Mar. 4, 2016  (JP) ................................ 2016-042756

(51) Int. Cl.
G06F 15/16   (2006.01)
H04L 29/08   (2006.01)
H04W 4/021   (2018.01)

(52) U.S. Cl.
CPC ........... *H04L 67/325* (2013.01); *H04W 4/021* (2013.01)

(58) Field of Classification Search
CPC ........ H04L 67/325; H04W 4/021; H04W 4/02
(Continued)

(56) References Cited

U.S. PATENT DOCUMENTS

2001/0034624 A1* 10/2001 Niwa ..................... G06Q 10/02
705/5
2010/0293246 A1* 11/2010 Urazoe ............... G06F 21/6218
709/217
(Continued)

FOREIGN PATENT DOCUMENTS

JP       2012-003721 A    1/2012
WO  WO 2009/093518 A1    7/2009
(Continued)

OTHER PUBLICATIONS

Japanese Office Action dated Sep. 24, 2019 in corresponding Japanese Patent Application No. 2016-042756 (4 pages) (3 pages English Translation).

*Primary Examiner* — Umar Cheema
*Assistant Examiner* — Anh Nguyen
(74) *Attorney, Agent, or Firm* — Staas & Halsey LLP

(57) ABSTRACT

An information processing device stores difference information indicating a difference, for each of a plurality of users, between a first schedule time point and an execution time point, the first schedule time point indicating a time point at which each of the plurality of users was to execute an operation, and the execution time point indicating a time point at which each of the plurality of users executed the operation, and when it is detected that a first terminal device carried by a first user included in the plurality of users enters a first region, specifies the difference corresponding to the first user, specifies a timing at which content data used for the operation is to be transmitted to the first terminal device, based on the difference corresponding to the first user and a second schedule time point at which the operation is to be executed by the first user.

12 Claims, 14 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2012/0004952 A1 | 1/2012 | Shimoi et al. | |
| 2013/0046719 A1 | 2/2013 | Sogo | |
| 2015/0081362 A1* | 3/2015 | Chadwick | G06Q 10/06311 |
| | | | 705/7.14 |
| 2015/0234897 A1* | 8/2015 | Kuninobu | G06F 16/2455 |
| | | | 707/736 |

FOREIGN PATENT DOCUMENTS

| | | |
|---|---|---|
| WO | WO 2011/070967 A1 | 6/2011 |
| WO | WO 2011/138972 A1 | 11/2011 |

\* cited by examiner

FIG. 3
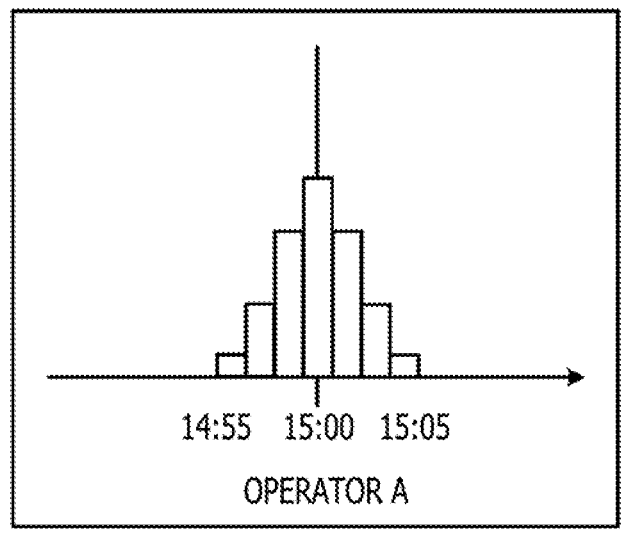
OPERATOR A
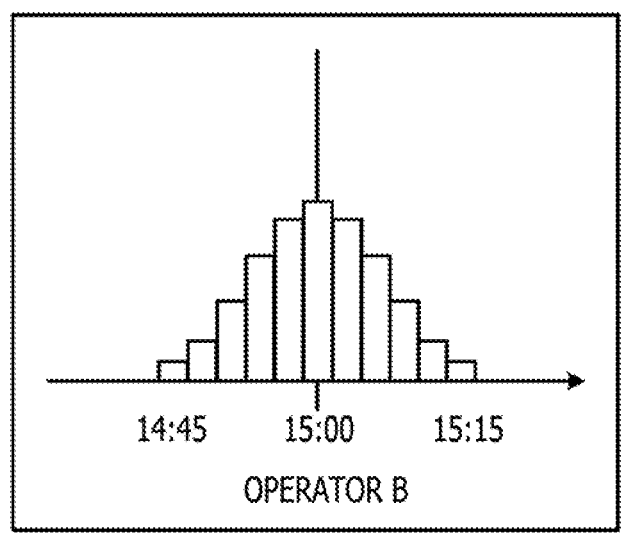
OPERATOR B
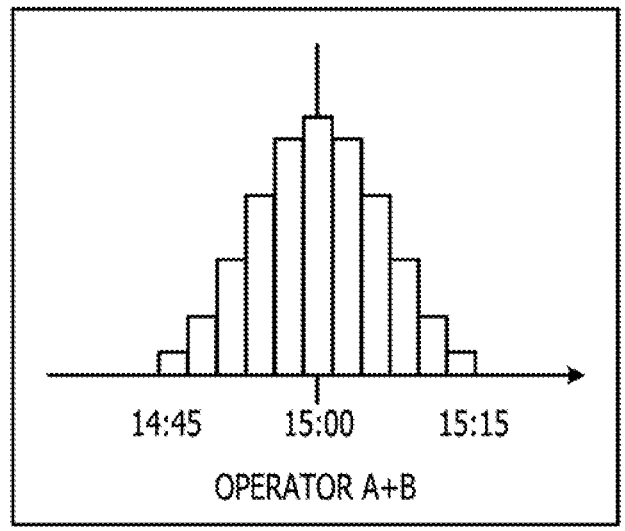
OPERATOR A+B

FIG. 4

| DATA ITEMS | DESCRIPTION | DATA EXAMPLE |
|---|---|---|
| OPERATION SCHEDULE ID | ID FOR DIFFERENTIATING OPERATION SCHEDULES, CORRESPONDING TO RECORD, IN OPERATION SCHEDULE DB | 00000000 |
| OPERATOR ID | ID OF OPERATOR WHO STARTS OPERATION | USER001 |
| RECORD TEMPORAL DIFFERENCE | DIFFERENCE BETWEEN DATE AND TIME AT WHICH OPERATION IS STARTED AND SCHEDULED OPERATION START DATE AND TIME OF CORRESPONDING OPERATION SCHEDULE | -00:03:45 |

FIG. 5

| DATA ITEMS | DESCRIPTION | DATA EXAMPLE |
|---|---|---|
| OPERATION SITE ID | ID OF SITE WHERE OPERATION IS SCHEDULED TO START | P0123456 |
| SITE NAME | NAME OF OPERATION SITE DESIGNATED WHEN USER REGISTERS SCHEDULE | HOUSE OF PATIENT J |
| AREA ID | ID OF AREA TO BE MONITORED BY TERMINAL DEVICE. RADIO IDENTIFIER OF BEACON. | SID22334455 |

FIG. 6

| | DATA ITEMS | DESCRIPTION | DATA EXAMPLE |
|---|---|---|---|
| 35a | OPERATION SCHEDULE ID | ID FOR DIFFERENTIATING OPERATION SCHEDULES | 00000000 |
| 35b | SCHEDULED OPERATION START DATE AND TIME | DATA ON SCHEDULED DATE AND TIME AT WHICH OPERATION IS STARTED | 2015/12/15 10:00:00 |
| 35c | AREA ID | ID OF AREA WHERE OPERATION IS SCHEDULED TO START. USER REGISTERS SITE NAME, AND SYSTEM REFERS TO OPERATION SPOT DB TO CONVERT SITE NAME TO AREA ID. | P0123456 |
| 35d | OPERATOR ID | IDS OF USERS GATHERING FOR OPERATION MULTIPLE ITEMS MAY BE DESIGNATED | USER001,USER002, USER003 |
| 35e | OPERATION TYPE | DATA USED FOR DIFFERENTIATING WHETHER OR NOT OPERATION IS OF SAME TYPE AS THAT OF ANOTHER OPERATION | VISITING MEDICAL EXAMINATION |
| 35f | CONTENTS ID | ID OF CONTENTS DISTRIBUTED DURING OPERATION. CONTENTS INFORMATION IS OBTAINED FROM CONTENTS MANAGEMENT SERVER USING CONTENTS ID (CONTENTS VOLUME MAY ALSO BE OBTAINED) | HOMON001 |

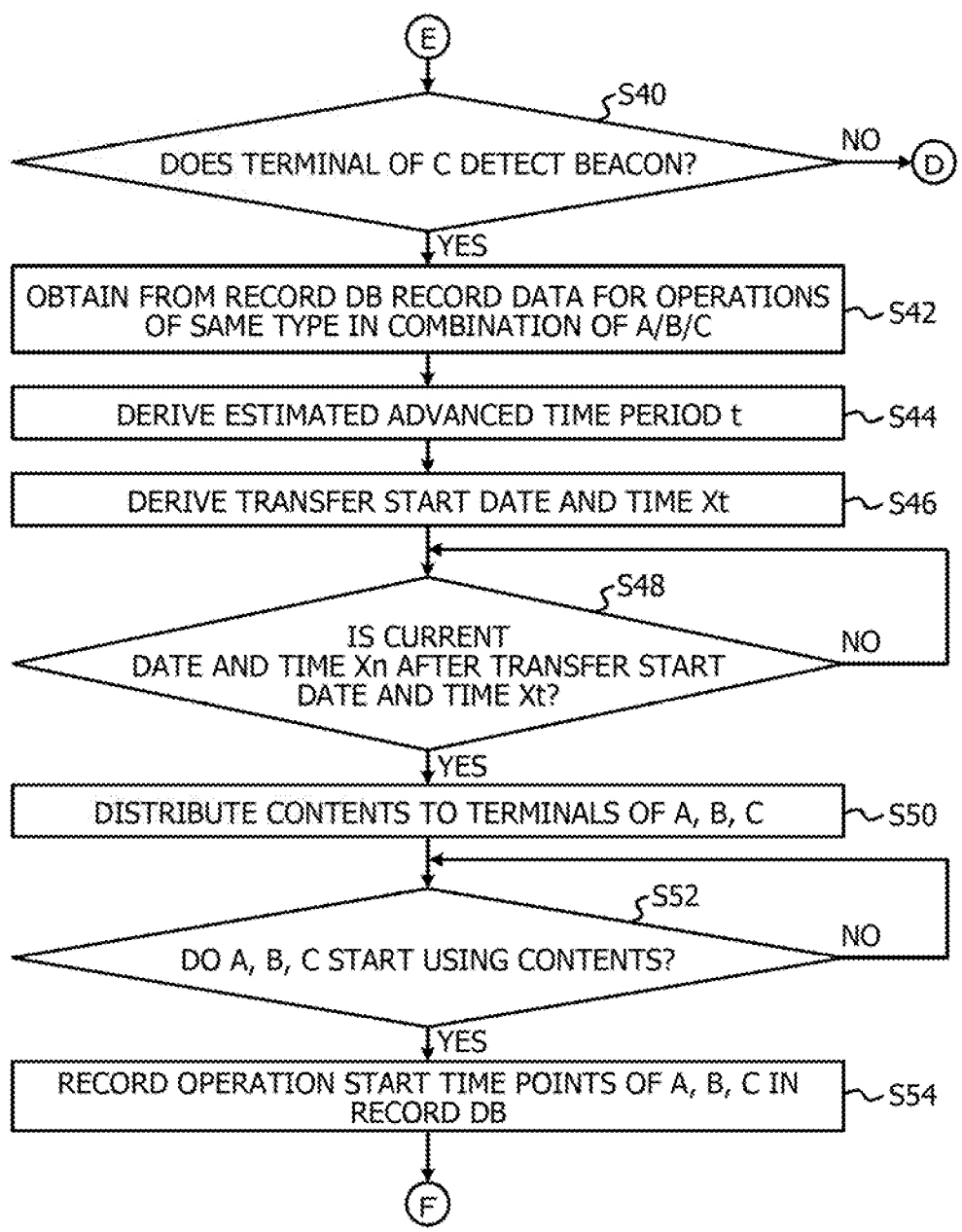

INFORMATION PROCESSING DEVICE, METHOD OF TRANSMITTING CONTENT DATA, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-042756, filed on Mar. 4, 2016, the entire contents of which are incorporated herein by reference.

FIELD

The embodiments discussed herein are related to an information processing device, a method of transmitting content data and a non-transitory computer-readable storage medium.

BACKGROUND

A technique is known which automatically distributes contents such as an application and data requested by a terminal device according to a type of operation performed by a user, and executes the contents at the terminal device. This makes it possible to use the most appropriate contents where and when the contents are requested, even if the contents are not installed in advance. In addition, in the distribution of contents of high confidentiality, the contents are not stored in the terminal device during the time other than during the operation time. Thereby, it is possible to avoid leakage of information.

As prior art documents, International Publication Pamphlet Nos. WO 2009/093518 and WO 2011/138972 are available.

SUMMARY

According to an aspect of the invention, an information processing device includes a memory configured to store difference information indicating a difference, for each of a plurality of users, between a first schedule time point and an execution time point, the first schedule time point indicating a time point at which each of the plurality of users was to execute an operation, and the execution time point indicating a time point at which each of the plurality of users executed the operation, and a processor coupled to the memory and configured to, when it is detected that a first terminal device carried by a first user included in the plurality of users enters a first region, specify, based on the difference information, the difference corresponding to the first user, specify a timing at which content data used for the operation is to be transmitted to the first terminal device, based on the difference corresponding to the first user and a second schedule time point at which the operation is to be executed by the first user, and transmit the content data to the first terminal device at the specified timing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 provides graphs illustrating examples of distribution of record temporal differences according to the embodiment;

FIG. 4 is a diagram illustrating an example of a record according to the embodiment;

FIG. 5 is a diagram illustrating an example of an operation spot according to the embodiment;

FIG. 6 is a diagram illustrating an example of an operation schedule according to the embodiment;

FIGS. 8A, 8B and 8C are flowcharts illustrating an example of contents management processing according to a first embodiment;

DESCRIPTION OF EMBODIMENTS

The timing at which contents are distributed to a terminal device may differ from user to user depending on their lives and differences in action. In the prior art technique described above, on the other hand, the timing at which the contents are distributed to the terminal device does not take into consideration past operation records of the user.

On the other hand, there is a method of distributing the contents in advance with the date and time scheduled for operation as the origin point. In this method, however, the operation start timing might not be the preset scheduled date and time. Thus, the distribution timing may not be necessarily optimized. Moreover, in the case where the contents are not distributed to the terminal device by the start of operation, it becomes impossible for the user to use the requested contents, resulting in an operation delay.

There is also a method of predicting the time point at which the user arrives an operation site based on a detection result of a sensor which detects the operation site, and making sure that the contents are distributed at the estimated time point. In this case, however, an operation spot detected by the sensor is assumed to be a very small area such as a "patient room" or a "bedside." Since, on the other hand, an area detection method such as radio wave detection detects an operation area which is larger than the operation spot, with the detection error in the order of 10 m, it is difficult to adjust the timing of distributing the contents prior to the start of operation for each different operation spot.

Hereinbelow, embodiments of the disclosure are described with reference to the attached drawings. Note that in the specification and the drawings, constituents having substantially the same functional configurations are assigned the same reference signs, and thereby redundant descriptions are omitted.

[Configuration of the Contents Distribution System]

Figure 1:
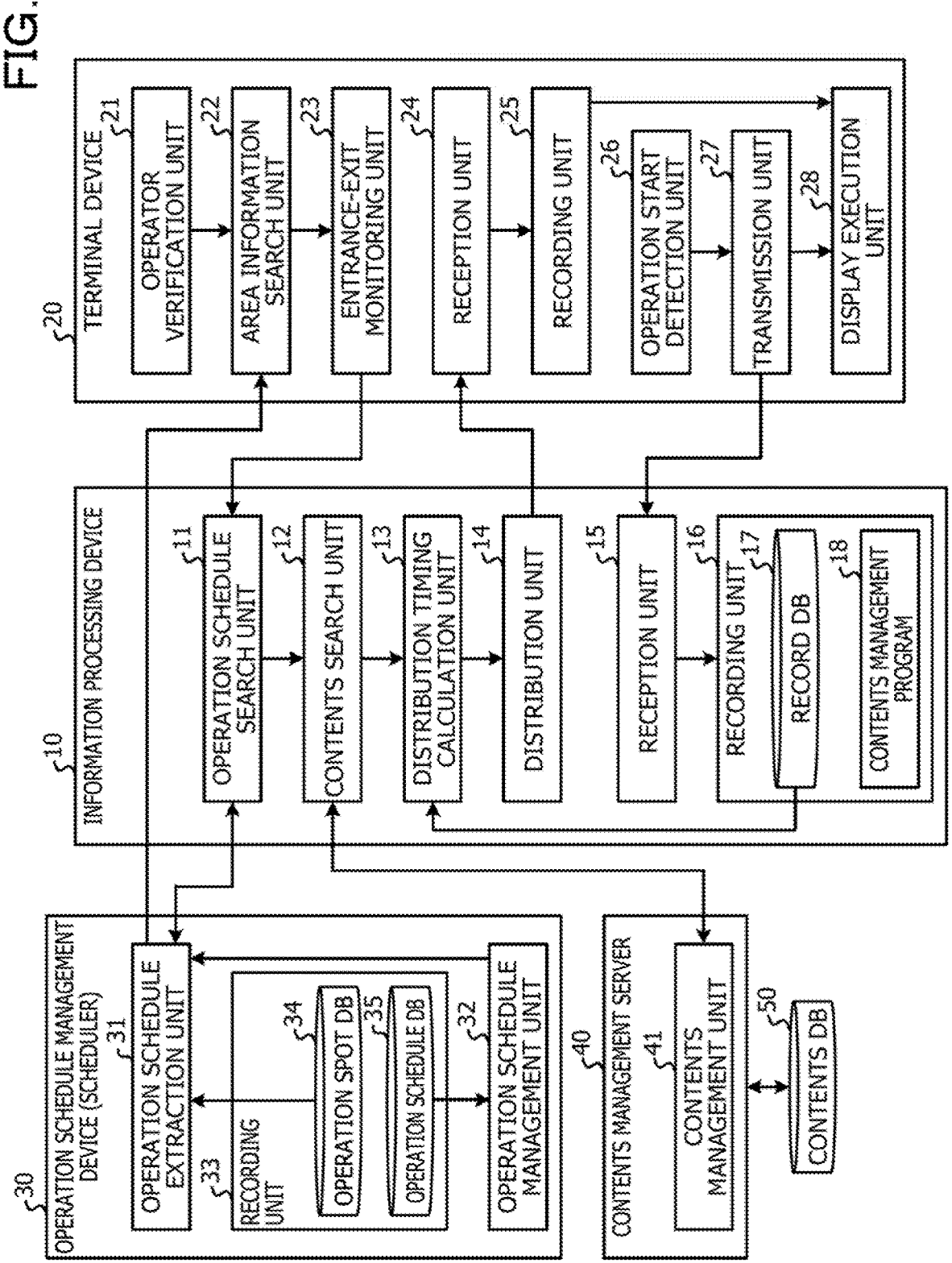
FIG. 1 is a diagram illustrating an example of a configuration of a contents distribution system according to an embodiment.

To begin with, a configuration of a contents distribution system according to a first embodiment of the disclosure is described with reference to FIG. 1. FIG. 1 is a diagram illustrating a configuration example of a contents distribution system according to an embodiment.

Prior to the operation of the user (also referred to as an "operator" hereinafter), the contents distribution system according to the embodiment distributes the contents, which are distributed from a contents management server 40, to a terminal device 20 of the operator.

In the specification, the "operation" refers to an action by a person of acting, with certain time as the origin point, on a target object and thereby obtaining an outcome such as obtaining a state of the target or changing the state of the target. Meanwhile, the "contents" collectively refers to an application executable on the terminal device 20, data displayable on the terminal device 20 using an application, or the like. Moreover, the "operation area or an area" includes the operation spot indicating a site of operation, and represents a square area (region) with each side in the order of several tens meters. The terminal device 20, if in the operation area, is capable of obtaining an area ID which differentiates operation areas.

The contents distribution system includes an information processing device 10, the terminal device 20 carried by the user (operator), an operation schedule management device (scheduler) 30, and the contents management server 40. The information processing device 10, the terminal device 20, the operation schedule management device 30, and the contents management server 40 are coupled to one another wirelessly or via a network.

In the contents distribution system according to the embodiment, the information processing device 10 distributes the contents to the terminal device 20 of the operator such that the operator is allowed to use and view the contents for operation simultaneously with the start of the operation. This makes it possible for the operator to smoothly start the operation and thereby to avoid an operation delay.

It is preferable that the timing of distributing the contents managed by the information processing device 10 does not have a margin of time to the scheduled time point for the start of operation, and that the distribution of the contents be completed simultaneously with the timing of the start of operation. This makes it possible to avoid leakage of information because the contents are not stored in the terminal device 20 during the time other than during the operation time. Thus, distribution of the contents with improved security is achieved. To put it differently, in the contents distribution system according to the embodiment, no limitation is imposed on the type of the contents to be distributed, and it is possible to securely distribute the contents without the leakage of information even if the contents are highly confidential such as medical records.

An example of using the contents distribution system according to the embodiment is the distribution of the contents in the case of visiting medical examination. In this case, by distributing data such as notes taken by other medical workers and visit records to the terminal device 20 prior to the start of the visiting medical examination, the doctor starting the visiting medical examination is allowed to immediately check those sets of data with the terminal device 20 at the start of the visiting medical examination. In addition, the automatic distribution of data and the display of the data enable the operator to reduce the number of manipulations of the terminal device 20, making it possible to avoid manipulation mistakes.

Another usage example is the distribution of the contents in the case of hospital medical examination. In this case, by distributing data of the medical records to the terminal device 20 prior to rounds, the doctor at the rounds is allowed to immediately check those sets of data with the terminal device 20 at the start of the rounds. In addition, the automatic distribution of medical records and the display of the medical records enable the doctor on the rounds to reduce time wasted before the examination.

Figure 2:
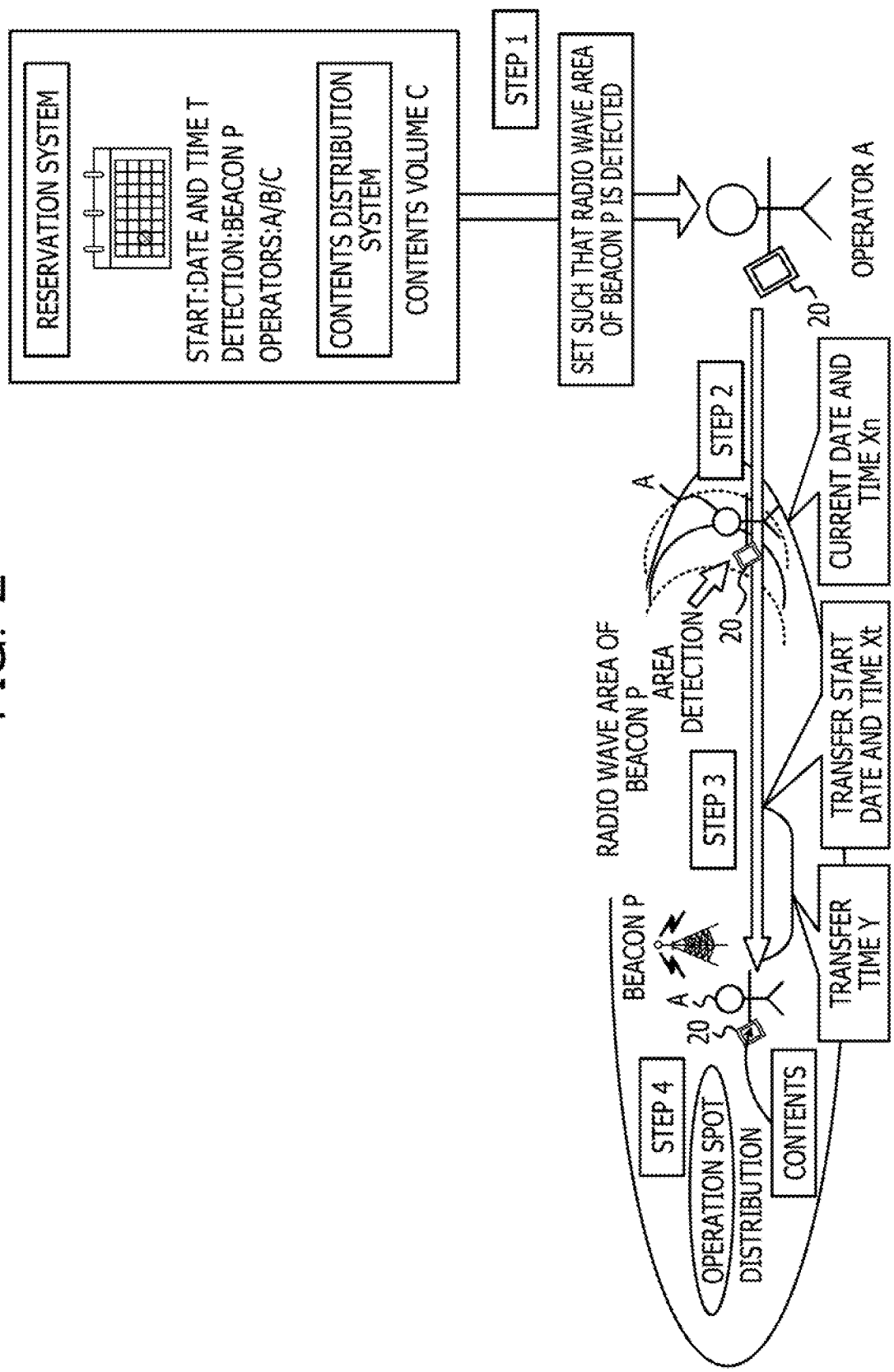
FIG. 2 is a diagram illustrating an example of how the contents distribution system according to the embodiment is used.

Hereinbelow, assume that operators, who use the contents distribution system according to the embodiment and are engaged in a certain operation, gather at the operation spot and start the operation. In addition, the operators decide beforehand the type of operation and the date of operation as the premise of using the contents distribution system according to the embodiment. Moreover, preset information in a reservation system illustrated in FIG. 2 are date and time T of the start of operation, a beacon P for detecting the entrance of the operators into the operation area including the operation spot, and the operators A, B, and C who perform the operation. Furthermore, a volume C of the contents to be distributed before the start of the operation is stored in a contents management system.

When the operation is started, the operators view and execute the distributed contents. From the viewpoint of security, the contents are not stored in advance in the terminal device 20. At the operation start timing, the transfer of the contents requested for the operation from the contents management system to the terminal devices 20 of the operators is completed. Thereby, the contents distribution system according to the embodiment makes it possible for the operators to remove the necessity of waiting for the transfer of the contents at the start of the operation, and to secure the confidentiality of the contents.

[Functional Configuration]

Back to FIG. 1, functional configurations of the information processing device 10, the terminal device 20, the operation schedule management device 30, and contents management server 40 are described in this order.

(Information Processing Device)

The information processing device 10 includes an operation schedule search unit 11, a contents search unit 12, a distribution timing calculation unit 13, a distribution unit 14, a reception unit 15, and a recording unit 16. The operation schedule search unit 11 checks whether the terminal device 20 detects the beacon. The contents search unit 12 searches for specific contents to be transmitted to the terminal device 20, and obtains the specific contents from the contents management server 40.

The distribution timing calculation unit 13 calculates the timing at which the contents are distributed. When the entrance of the operators into the area of the operation spot is detected from all the terminal devices 20 of the operators registered in an operation schedule DB, the distribution timing calculation unit 13 may calculate the distribution timing of the contents associated with an operation schedule ID. In addition, when the entrance of the operators into the area of the operation spot is detected from a predetermined number or more of terminal devices 20 of the operators registered in the operation schedule DB, the distribution timing calculation unit 13 may calculate the distribution timing of the contents associated with the operation schedule ID.

The distribution timing calculation unit 13 calculates an estimated advanced time period from the difference (see a record temporal difference of a record DB 17) between the scheduled start date and time and the actual operation start date and time regarding the operator's past operations of the same type, and calculates transfer time from the volume of the contents. The distribution timing calculation unit 13 calculates the distribution timing by subtracting the estimated advanced time period and the transfer time from the scheduled start date and time of the operation. This makes it possible to calculate the difference in start time of operation for each operator using past records and to find the approximate earliest operation start time point. Thus, it is possible to optimize the distribution timing of the contents for operation.

For example, in the case of repetitive operations of the same type such as services of the visiting medical examination and the rounds, the distribution of the record temporal differences becomes a normal distribution for each operator, with examples illustrated as in FIG. 3. Meanwhile, the variance of record temporal differences differs depending on the operator, which is attributed to the operator's habits, lifestyle, and the like. Hence, when the operator A and the operator B perform a predetermined operation, it is possible to calculate an estimated advanced time period t based on a normal distribution for the operators A+B, which is the sum of the normal distribution of the past record temporal differences of the operator A and the normal distribution of the past record temporal differences of the operator B.

To put it differently, at the operator level, it is unlikely that each of the operators is affected by external disturbances because the operator has experience regarding the action. Also, the operators communicate beforehand with one another to bear in mind that they do not disturb others. Thus, the start time point is more accurate compared to that for the scheduled action determined by a single operator. Hence, based on the three-sigma rule, it is possible to calculate the estimated advanced time period t using Formula (1).

$$\text{estimated advanced time period } t = \sqrt{\frac{\sum_{i=1}^{N}(\text{record temporal difference } X_i)^2}{\text{number of records obtained } N - 1}} \times 3 \quad \text{(Formula 1)}$$

The number of records obtained N in Formula (1) is the number of sets of past record data of a predetermined operator recorded in the record DB 17.

Note that the three-sigma rule is a common method of removing an outlier in the case of a normal distribution. However, the method of calculating the estimated advanced time period t is not limited to this. The difference between the actual operation start time point and the scheduled operation time point for each operator may be calculated using another appropriate calculation method. For example, the estimated advanced time period t may be set to a fixed value. In addition, the estimated advanced time period t may be set to a time period or the like defined by eighty percent or other percentages of the time from the center to a tail end of one of the normal distributions of the record temporal differences illustrated in FIG. 3 for a predetermined operator. The record temporal differences of the normal distribution except the record temporal differences beyond a predetermined threshold may be used as the estimated advanced time period t.

Back to FIG. 1, the distribution unit 14 distributes the contents for operation at the timing calculated by the distribution timing calculation unit 13. The reception unit 15 receives a notification from the terminal device 20 that the operators start using the contents. The reception unit 15 receives record data indicating the start time point of the operation from the terminal device 20.

The recording unit 16 includes the record DB 17 and a contents management program 18. In the record DB 17, record data on the time at which each operator arrives at the operation site is registered. FIG. 4 illustrates an example of the record DB 17 according to the embodiment. In the record DB 17, data items, namely, an operation schedule ID 17*a*, an operator ID 17*b*, and a record temporal difference 17*c* are recorded.

The operation schedule ID 17*a* records an ID for differentiating operation schedules, corresponding to the record, in an operation schedule DB 35. The operator ID 17*b* records the ID of the operator who starts the operation. The record temporal difference 17*c* records the difference between the date and time at which the operation is started and the scheduled operation start date and time of the corresponding operation schedule. As described above, in the record DB 17, the difference (record temporal difference) between the actual operation start time point at which the operator performs the operation and the scheduled start time point is recorded as the past record data.

Incidentally, the information processing device 10 may be a personal computer (PC), a tablet terminal device, a personal digital assistant (PDA), or a server.

Note that the contents management program 18 installed in the recording unit 16 causes a CPU (see FIG. 11) of the information processing device 10 to execute processing which implements each of the operation schedule search unit 11, the contents search unit 12, the distribution timing calculation unit 13, and the distribution unit 14 of the information processing device 10.

(Terminal Device)

The terminal device 20 is an example of a mobile device carried by each operator, and includes an operator verification unit 21, an area information search unit 22, an entrance-exit monitoring unit 23, a reception unit 24, a recording unit 25, an operation start detection unit 26, a transmission unit 27, and a display execution unit 28.

The operator verification unit 21 verifies whether the operator is allowed to use the terminal device 20. For example, the operator verification unit 21 prompts the operator to input the ID and the password, and verifies the operator based on the inputted information. The area information search unit 22 obtains information on the area which includes the predetermined operation spot and is to be monitored from the operation schedule management device 30.

The entrance-exit monitoring unit 23 monitors the entrance and exit of the operators into and from the area to be monitored. The reception unit 24 communicates with the distribution unit 14 of the information processing device 10, and receives the contents for operation from the information processing device 10.

The recording unit 25 is an example of a memory which temporarily stores the distributed contents. The operation start detection unit 26 detects the start of operation by the operator. The transmission unit 27 transmits the start time point at which the operator starts the operation to the information processing device 10. The display execution unit 28 displays the contents and requested data, and executes the processing requested for the operation.

Incidentally, the terminal device 20 may be a smartphone, a video camera, a digital camera, a personal digital assistant (PDA), a mobile phone, a portable music player, a portable video processing device, a portable game console, a wearable display device such as a head mounted display, or the like.

(Operation Schedule Management Device (Scheduler))

The operation schedule management device 30 manages the operation schedule for each operator. The operation schedule management device 30 includes an operation schedule extraction unit 31, an operation schedule management unit 32, and a recording unit 33. The recording unit 33 records an operation spot DB 34 and the operation schedule DB 35.

FIG. 5 illustrates an example of the operation spot DB 34 according to the embodiment. In the operation spot DB 34, data items, namely, an operation site ID 34*a*, a site name 34*b*, and an area ID 34*c* are recorded. The operation site ID 34*a* records the ID of the site where the operation is scheduled to start. The site name records the name of the operation site designated when the operator registers the schedule. The area ID records the ID of the area to be monitored by the terminal device 20 which is held by the operator heading to the operation spot. As an example of the ID of the area to be monitored, a radio identifier of the beacon is recorded in the area ID in the embodiment.

FIG. 6 illustrates an example of the operation schedule DB 35 according to the embodiment. In the operation schedule DB 35, data items, namely, an operation schedule ID 35*a*, scheduled operation start date and time 35*b*, an area ID 35*c*, an operator ID 35*d*, an operation type 35*e*, and a contents ID 35*f* are recorded. The operation schedule ID 35*a* records the ID for differentiating operation schedules. The scheduled operation start date and time 35*b* records data indicating the scheduled date and time at which the operation is started.

The area ID 35*c* records the ID of the area where the operation is scheduled to start. When the operator registers "site name," the recording unit 33 of the operation schedule management device 30 refers to the operation spot DB 34, extracts the area ID associated with the "site name," and saves the area ID in the area ID 35*c*. The operator ID 35*d* records the IDs of the operators gathering for the operation. Multiple IDs of the operators may be designated as the operator ID 35*d*. The operation type 35*e* records the type of operation. The operation type 35*e* is used for differentiating whether the operations are of the same type or different types. For example, the operation type 35*e* records the visiting medical examination, the rounds, or the like. The contents ID 35*f* records the ID of the contents distributed during the operation. The contents are obtained from the contents management server 40 using the contents ID. At this time, the volume of the contents may also be obtained from the contents management server 40.

Back to FIG. 1, the operation schedule management unit 32 registers the operation schedules in the operation schedule DB 35 to manage the operation schedules. Also, the operation schedule management unit 32 displays the status of the operation schedules in response to the operators' requests, enabling the operators to view the status of the operation schedules. The operation schedule management unit 32 manages a single operation schedule by associating at least the scheduled operation start time, the operation site, and the operator to the single operation schedule with each other. The operation schedule management unit 32 manages an operation schedule involving the distribution of the contents by associating the contents ID 35*f* with the operation schedule DB 35.

The operation schedule extraction unit 31 searches the operation spot DB 34 and the operation schedule DB 35 managed by the operation schedule management unit 32, and extracts information on a predetermined operation schedule. In the case where the area ID 35*c* of the operation schedule DB 35 matches the area ID 34*c* of the operation spot DB 34, the operation schedule extraction unit 31 extracts information on the predetermined operation schedule recorded in the DBs, corresponding to the matching areas ID 34*c* and 35*c*.

For example, the operation schedule extraction unit 31 transfers to the operation schedule search unit 11 information extracted in relation to the scheduled operation which is performed at the operation spot of the area corresponding to the beacon detected by the operation schedule search unit 11. Also, the operation schedule extraction unit 31 may transfer to the area information search unit 22 of the terminal device 20 the radio identifier of the beacon recorded in the extracted area ID 34*c*.

(Contents Management Server)

Figure 7:
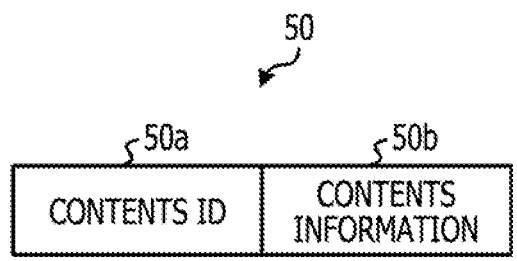
FIG. 7 is a diagram illustrating an example of a contents according to the embodiment.

The contents management server 40 manages the contents to be distributed to the terminal device 20 via the information processing device 10. As illustrated in FIG. 7, a contents DB 50 records contents information (contents) 50*b* associated with a contents ID 50*a*. The contents management server 40 extracts the contents with the contents ID requested by the contents search unit 12 of the information processing device 10 based on the contents DB 50, and transfers the contents to the contents search unit 12.

Note that FIG. 1 depicts a block diagram focusing on the respective functions of the information processing device 10, the terminal device 20, the operation schedule management device 30, and the contents management server 40. The components illustrated using these functional blocks may be implemented only with hardware, only with software, or with a combination of hardware and software.

In the information processing device 10 of the embodiment, the CPU (see FIG. 11) executes the contents management processing using the contents management program 18 and various types of data.

In the contents management system of the embodiment, the operators carry the terminal devices 20 and are provided with the services of the system thanks to the above configuration. Assume the case where the service is the visiting medical examination, for example. A patient designates the date and time when he/she wishes to be examined, and a doctor or a nurse adjusts the schedule. Thereby, the site and the start date and time of examination operation are determined. The determined start date and time is registered in the reservation system.

As has been illustrated in the reservation system of FIG. 2, the operator A accesses the application of the reservation system before departing for the operation site, and obtains from the scheduler information on the start date and time T, a beacon P for detection, and operator names A, B, and C. Note that the operator A may not obtain the information on the start date and time T and the operator names A, B, and C as long as the terminal device 20 obtains the information on the beacon P for detection. Here, assume that the volume of the contents to be distributed is C.

(Step 1)

Before going for the operation, the operator A activates the application of the reservation system installed in the terminal device 20, and inputs the ID and the password of the operator A. Thus, the schedule as illustrated in FIG. 2 is displayed, and setting is performed such that the radio wave area of the beacon P is detected by the terminal device 20. The operator A departs, carrying the terminal device 20.

(Step 2)

When the operator A approaches the operation spot and enters the operation area, the terminal device 20 carried by the operator A detects the beacon P. The terminal device 20 notifies the information processing device 10 of the detection of the beacon P. Thereby, the information processing device 10 is allowed to know that the operator A is in the vicinity of the operation spot.

In the case where the information processing device 10 knows the entrance of all the operators into the area, the information processing device 10 may search for the past record temporal differences accumulated in the record DB 17, generate the distributions of the record temporal differences at the time of addition of the normal distributions of all the operators as illustrated in FIG. 3, and calculate the estimated advanced time period t. Note that in the case where the information processing device 10 knows the entrance of a predetermined number or more of operators into the area (when operators equal to or more than a threshold, for example, eighty percent of all the operators or more than half of them, gather), the information processing device 10 may calculate the estimated advanced time period t even if the entrance of all the operators into the area is not detected. This makes it possible to calculate the estimated advanced time period t based on the past record temporal differences of the operators except those absent.

The information processing device 10 specifies the area ID from the detected beacon P, and specifies as the target operation the operation of the operation schedule ID $35a$ which is associated with the area ID $35c$ of the operation schedule DB 35 and with the operator ID $35d$ associated with the terminal device 20 having notified the detection of the beacon P. In the case where a predetermined number of operators notify the information processing device 10 of the detection of the beacon P regarding the specified operation, the information processing device 10 obtains from the record DB 17 all the records of the record temporal differences of the past operations for the combination of those operators. The information processing device 10 calculates the estimated advanced time period t from the obtained record temporal differences for the predetermined number of operators. The standard deviation $\sigma$ of the amount of record temporal difference is calculated and $3\sigma$ is the estimated advanced time period t.

(Step 3)

After the estimated advanced time period t is calculated, the information processing device 10 calculates a scheduled start date and time Xs as follows: transfer time Y=volume C of the contents/transfer speed . . . Formula (2), scheduled start date and time Xs=scheduled operation date and time T−estimated advanced time period t . . . Formula (3).

From Formula (2) and Formula (3), transfer start date and time Xt=scheduled start date and time Xs−transfer time Y.

When the calculated transfer start date and time Xt is reached, the information processing device 10 distributes the contents for operation to the terminal device 20. Note that the information processing device 10 immediately distributes the contents to the terminal device 20 if a current date and time Xn is after the calculated transfer start date and time Xt.

The terminal device 20 is configured to notify the information processing device 10 of that the terminal device 20 is out of reach. In the case where the information processing device 10 is notified that the terminal device 20 exits the operation area, the information processing device 10 deletes the contents stored in the recording unit 25 inside the terminal device 20.

(Step 4)

As an example, when arriving at the operation spot, the operator places the terminal device 20 over a near field communication (NFC) tag installed in the operation site, thereby reading the NFC tag. Since the distribution of the contents is completed by this time, the terminal device 20 carried by the operator executes the distributed contents. This makes it possible to start the scheduled operation after the operators, who are scheduled to perform the operation, arrive at and gather in the operation spot.

In addition, the terminal device 20 records the date and time at which the NFC tag is read in the recording unit 25 as the operation start date and time of the operator, and transfers the operation start date and time to the information processing device 10. The information processing device 10 records the record temporal differences indicating the difference between the transferred operation start date and time and the date and time scheduled for operation in the record DB 17. At that moment, the information processing device 10 associates the record temporal differences and the operators associated with the terminal devices 20 having notified the information processing device 10 of the read of the NFC tag, with each other, and records the record temporal differences and the operators in the record DB 17.

As illustrated in step 1 to step 4 of FIG. 2, in the contents management system of the embodiment, each of a detection boundary for entrance into the area associated with the operation spot, the operation spot, and the distribution of the contents is dealt with using a time axis. In addition, for the operation start date and time determined by two or more operators, the amount of difference between the determined date and time and the actual operation start date and time is stochastically within a certain range.

With the above taken into consideration, the information processing device 10 of the embodiment calculates the estimated advanced time period t and distributes the contents based on the estimated advanced time period t. This makes it possible to distribute the contents requested for the operation at an appropriate timing according to the records. Thus, it is possible that the contents are not stored in the terminal device 20 during the time other than during the operation time particularly in the distribution of contents of high confidentiality. As a result, leakage of information may be avoided.

<First Embodiment>

[Contents Management Processing]

Figure 8A:
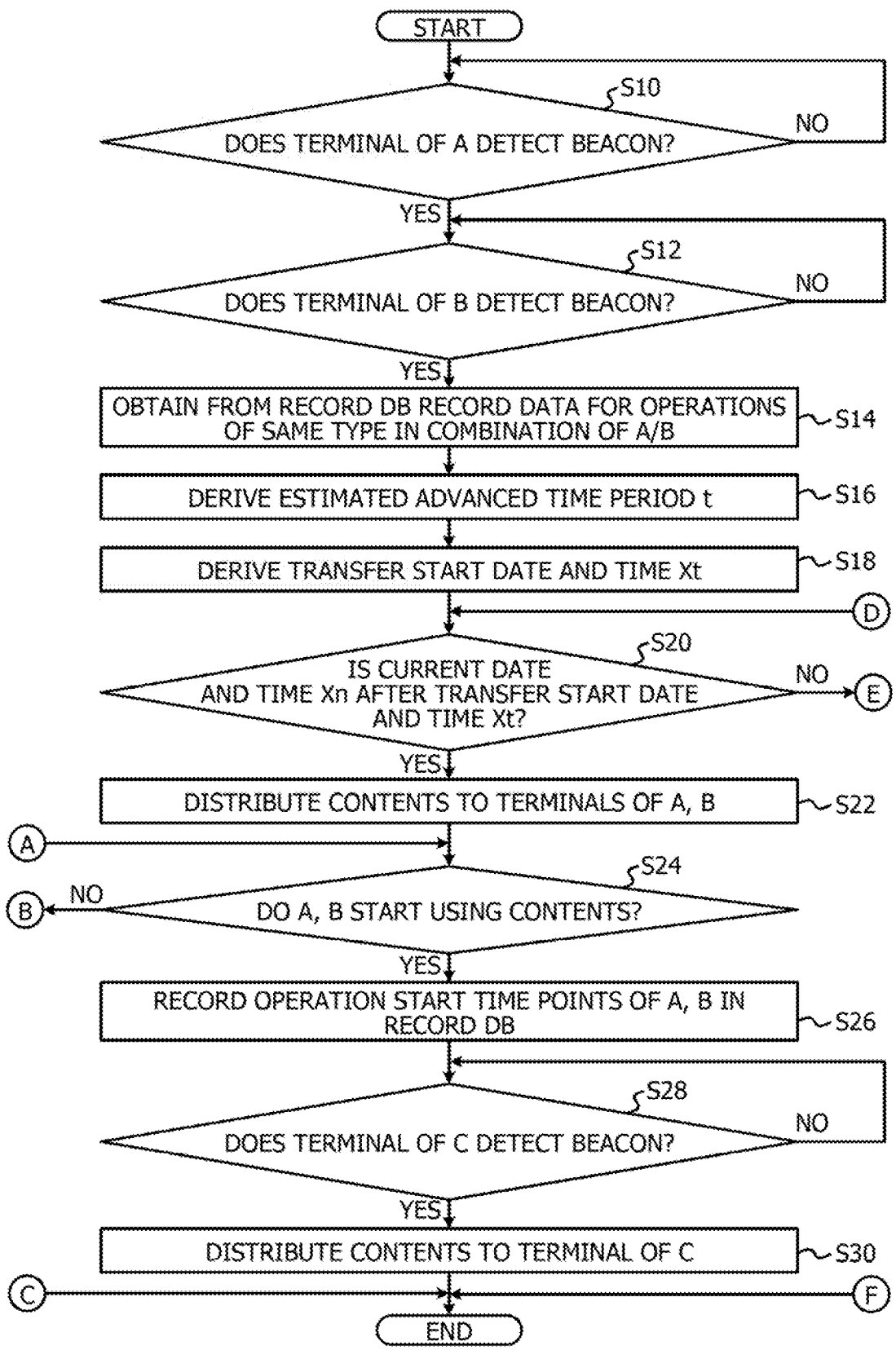
Figure 8B:
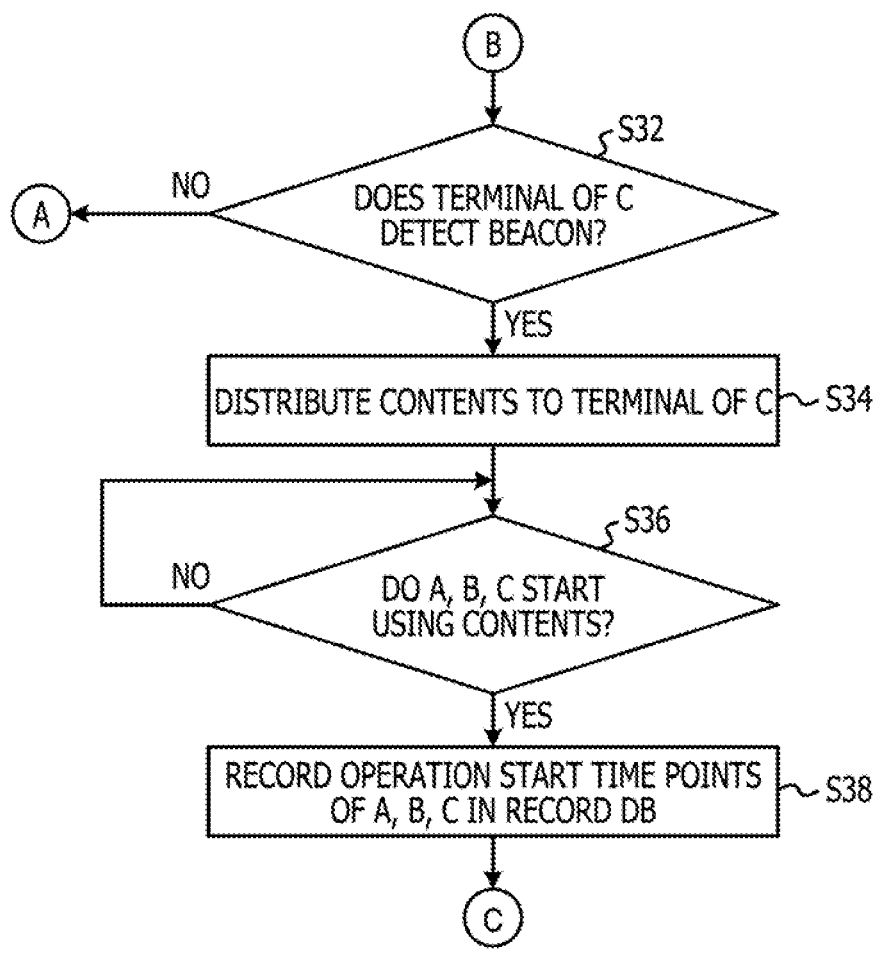

Subsequently, the contents management processing according to the embodiment is described with reference to FIGS. 8A to 8C. FIGS. 8A to 8C are flowcharts illustrating an example of the contents management processing according to the first embodiment. In the contents management processing according to the first embodiment, a procedure is given below which takes into consideration the case where an operator registered for the operation schedule of the reservation system (a person scheduled to participate in the operation) is unexpectedly unable to participate on the day or is late for a special reason. In the embodiment, consecutive distribution timing calculation processing is performed in the case where a predetermined number or more (here, two) of the operators registered in the reservation system detect a desired beacon. Here, the case where three operators A, B, and C are scheduled to participate in the same operation is described as an example.

When the main processing is started, the operation schedule search unit 11 determines whether or not the terminal device 20 of the operator A detects the beacon (step S10). When it is determined that the beacon is not detected, the processing returns to step S10, and when it is determined that the beacon is detected, the processing proceeds to step S12. The detection of the beacon is performed by the terminal device 20 monitoring a signal of the beacon which indicates the radio identifier of the beacon set in the terminal device 20 (displayed when the schedule is displayed). Monitored by the terminal device 20 is the radio identifier of the beacon with the area ID 34c in the operation spot DB 34 corresponding to the area ID 35c associated with the operation schedule ID 35a in the operation schedule DB 35 which is displayed when the schedule is displayed.

Subsequently, the operation schedule search unit 11 determines whether or not the terminal device 20 of the operator B detects the beacon (step S12). When it is determined that the beacon is not detected, the processing returns to step S12, and when it is determined that the beacon is detected, the processing proceeds to step S14.

Subsequently, the distribution timing calculation unit 13 searches the record DB 17 and obtains the record data for the operations of the same type in which the operator A and the operator B participated (step S14). Next, the distribution timing calculation unit 13 substitutes the obtained record data into Formula (1) and thereby calculates the estimated advanced time period t (step S16). Then, the distribution timing calculation unit 13 calculates the transfer start date and time Xt based on the calculated estimated advanced time period t (step S18).

Subsequently, the distribution timing calculation unit 13 determines whether or not the current date and time Xn is after the transfer start date and time Xt (step S20). When the distribution timing calculation unit 13 determines that the current date and time Xn is before the transfer start date and time Xt, the processing proceeds to step S40.

On the other hand, when the distribution timing calculation unit 13 determines that the current date and time Xn is after the transfer start date and time Xt, the distribution unit 14 distributes the contents to the terminal devices 20 of the operator A and the operator B (step S22). Subsequently, the reception unit 15 determines whether or not a notification is received that the operator A and the operator B start using the contents (step S24). For example, in the case where the terminal devices 20 of the operator A and the operator B are placed over the NFC of the operation spot, the reception unit 15 receives a notification that the operator A and the operator B start using the contents. In that case, the recording unit 16 records the operation start time points of the operator A and the operator B in the record DB 17 (step S26).

Subsequently, the operation schedule search unit 11 determines whether or not the terminal device 20 of the operator C detects the beacon (step S28). The processing of step S28 is repeated until the terminal device 20 of the operator C detects the beacon. When it is determined that the beacon is detected, the distribution unit 14 distributes the contents to the terminal device 20 of the operator C (step S30), and terminates the main processing.

At step S24, when it is determined that a notification is not received that the operator A and the operator B start using the contents, the operation schedule search unit 11 determines whether or not the terminal device 20 of the operator C detects the beacon (step S32). The processing of step S32 is repeated until the terminal device 20 of the operator C detects the beacon. When it is determined that the beacon is detected, the distribution unit 14 distributes the contents to the terminal device 20 of the operator C (step S34). Subsequently, the reception unit 15 determines whether or not a notification is received that the operators A, B, and C start using the contents (step S36). The processing of step S36 is repeated until the operator A, the operator B, and the operator C start using the contents. When operator A, operator B, and operator C start using the contents, the recording unit 16 records the operation start time points of operator A, operator B, and operator C in the record DB 17 (step S38), and terminates the main processing.

At step S40, the operation schedule search unit 11 determines whether or not the terminal device 20 of the operator C detects the beacon. When the operation schedule search unit 11 determines that the beacon is not detected, the processing returns to that of step S20. When the operation schedule search unit 11 determines that the beacon is detected, the distribution timing calculation unit 13 searches the record DB 17, and obtains the record data for the operations of the same type in which operator A, operator B, and operator C participated (step S42). Subsequently, the distribution timing calculation unit 13 substitutes the obtained record data into Formula (1) and thereby calculates the estimated advanced time period t (step S44). Next, the distribution timing calculation unit 13 calculates the transfer start date and time Xt based on the calculated estimated advanced time period t (step S46).

Subsequently, the distribution timing calculation unit 13 determines whether or not the current date and time Xn is after the transfer start date and time Xt (step S48). Step S48 is repeated during the time the current date and time Xn is before the transfer start date and time Xt. When the current date and time Xn is after the transfer start date and time Xt, the distribution unit 14 distributes the contents to the terminal devices 20 of operator A, operator B, and operator C (step S50). Next, the reception unit 15 determines whether or not a notification is received that operator A, operator B, and operator C start using the contents (step S52). For example, in the case where the terminal devices 20 of operator A, operator B, and operator C are placed over the NFC of the operation spot, the reception unit 15 receives a notification that operator A, operator B, and operator C start using the contents. In that case, the recording unit 16 records the operation start time points of operator A, operator B, and operator C in the record DB 17 (step S54), and terminates the main processing.

As above, in the contents management processing according to the first embodiment, the estimated advanced time period t is calculated based on the past record temporal differences of a predetermined number of operators even in the case where at least any of the operators is late for a special reason, for example in the case where an operator is unexpectedly unable to participate on the day. Then, the appropriate start timing of transferring the contents for operation is calculated corresponding to the estimated advanced time period t. As described above, in the embodiment, the distribution timing of the contents is calculated taking into consideration the difference (record temporal difference) between the past record operation start time point and the scheduled start time point. The record temporal differences exhibit a different normal distribution for each operator. Thus, it is possible to distribute the contents to the terminal devices 20 of the predetermined operators by calculating the distribution timing of the contents according to the operators' habits and lifestyles, taking into consideration the record temporal differences of each operator. Hence, in the distribution of contents of high confidentiality such as medical records and other contents, the contents are not stored in the terminal device 20 during the time other than during the operation time. Thereby, it is possible to avoid leakage of information.

<Second Embodiment>
[Contents Management Processing]

Figure 9A:
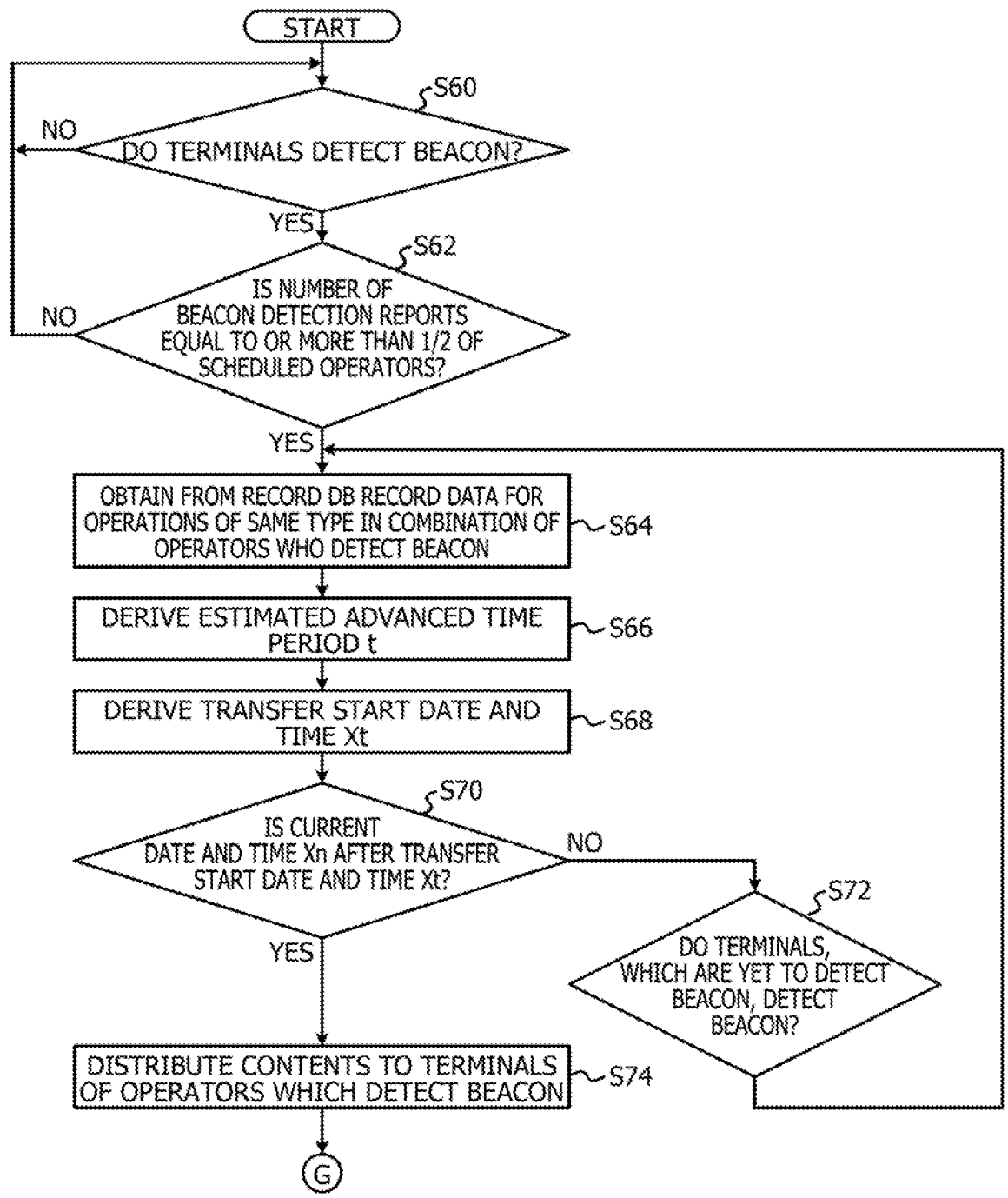
FIGS. 9A and 9B are flowcharts illustrating an example of contents management processing according to a second embodiment.
Figure 9B:
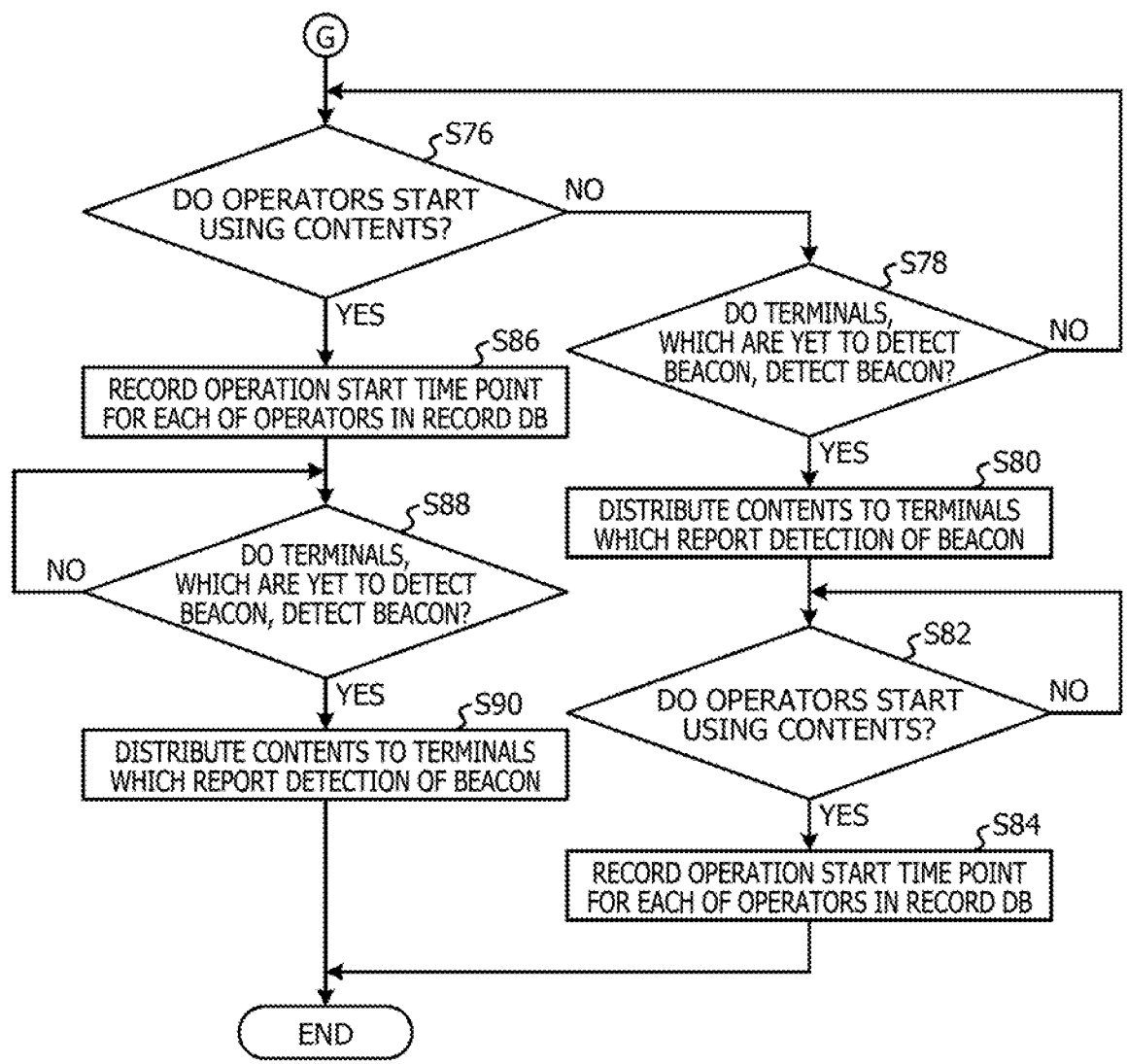

Subsequently, the contents management processing according to the embodiment is described with reference to FIGS. 9A and 9B. FIGS. 9A and 9B are flowcharts illustrating an example of the contents management processing according to a second embodiment. In the contents management processing according to the second embodiment, the case is described where calculation of the distribution timing of the contents is executed at a point of time at which equal to or more than ½ of the terminal devices 20 carried by two or more operators notify the information processing device 10 of that the beacon is detected.

When the main processing is started, the operation schedule search unit 11 determines whether or not the terminal devices 20 of the operators detect the beacon (step S60). When it is determined that the beacon is not detected, the processing returns to step S60. When it is determined that the beacon is detected, the operation schedule search unit 11 determines whether or not the number of terminal devices 20 which report the detection of the beacon (hereinafter referred to as the "number of beacon detection reports") is equal to or more than ½ of the number of the operators scheduled to participate (step S62).

When it is determined that the number of beacon detection reports is less than ½ of the number of the operators, the operation schedule search unit 11 returns to step S60 and repeats the processing of steps S60 and S62. When the operation schedule search unit 11 determines that the number of beacon detection reports is equal to or more than ½ of the number of the operators, the distribution timing calculation unit 13 searches the record DB 17 and obtains the record data for the operations of the same type in which the operators of the terminal devices 20 which report the detection of the beacon participated (step S64). Subsequently, the distribution timing calculation unit 13 substitutes the obtained record data into Formula (1) and thereby calculates the estimated advanced time period t (step S66). Next, the distribution timing calculation unit 13 calculates the transfer start date and time Xt based on the calculated estimated advanced time period t (step S68).

Subsequently, the distribution timing calculation unit 13 determines whether or not the current date and time Xn is after the transfer start date and time Xt (step S70). When the distribution timing calculation unit 13 determines that the current date and time Xn is after the transfer start date and time Xt, the processing proceeds to step S74. On the other hand, when the distribution timing calculation unit 13 determines that the current date and time Xn is before the transfer start date and time Xt, the operation schedule search unit 11 determines whether or not the terminal devices 20, which are yet to detect the beacon, detect the beacon (step S72). When it is determined that the beacon is detected, the processing returns to S64, and the processing from step S64 to step S70 is repeated.

When it is determined that the current date and time Xn is after the transfer start date and time Xt at step S70 or when it is determined that the beacon is not detected at step S72, the processing proceeds to step S74. At step S74, the distribution unit 14 distributes the contents to the terminal devices 20 of the operators which detect the beacon.

Subsequently, the reception unit 15 determines whether or not a notification is received that the operators to whom the contents are distributed start using the contents (step S76). When the reception unit 15 receives a notification that the operators to whom the contents are distributed start using the contents, it is determined that the operators to whom the contents are distributed start using the contents. In this case, the recording unit 16 records the operation start time point for each of the operators to whom the contents are distributed in the record DB 17 (step S86). The operation schedule search unit 11 determines whether or not the terminal devices 20, which are yet to detect the beacon, detect the beacon (step S88). Step S88 is repeated while the beacon is not detected. When the beacon is detected, the distribution unit 14 distributes the contents to the terminal devices 20 which detect the beacon (step S90), and terminates the main processing.

If the reception unit 15 does not receive a notification that the operators to whom the contents are distributed start using the contents at step S76, it is determined that the operators to whom the contents are distributed do not start using the contents. In this case, the operation schedule search unit 11 determines whether or not the terminal devices 20, which are yet to detect the beacon, detect the beacon (step S78). The processing returns to step S76 while the beacon is not detected. When the beacon is detected, the distribution unit 14 distributes the contents to the terminal devices 20 which detect the beacon (step S80).

Subsequently, the reception unit 15 determines whether or not a notification is received that the operators to whom the contents are distributed start using the contents (step S82). The processing of step S82 is repeated until it is determined that the operators to whom the contents are distributed start using the contents. When it is determined that the operators to whom the contents are distributed start using the contents, the recording unit 16 records the operation start time point for each of the operators to whom the contents are distributed in the record DB 17 (step S84), and terminates the main processing.

As above, in the contents management processing according to the second embodiment, the estimated advanced time period t is calculated based on the past record temporal differences of the operators when equal to or more than ½ of the participating operators enter the operation area. Then, the appropriate start timing of transferring the contents for operation is calculated corresponding to the estimated advanced time period t. Thus, in the embodiment, it is possible to distribute the contents at an appropriate timing to the terminal devices 20 of the predetermined operators.

Although the threshold for calculating the estimated advanced time period t is set to "½" in the embodiment, the threshold is not limited to this value. When operators equal to or more than a predetermined threshold enter the operation area, the estimated advanced time period t may be calculated based on the past record temporal differences of the operators having entered the operation area. Then, the appropriate start timing of transferring the contents for operation may be calculated corresponding to the estimated advanced time period t.

<Third Embodiment>
[Contents Management Processing]

Figure 10:
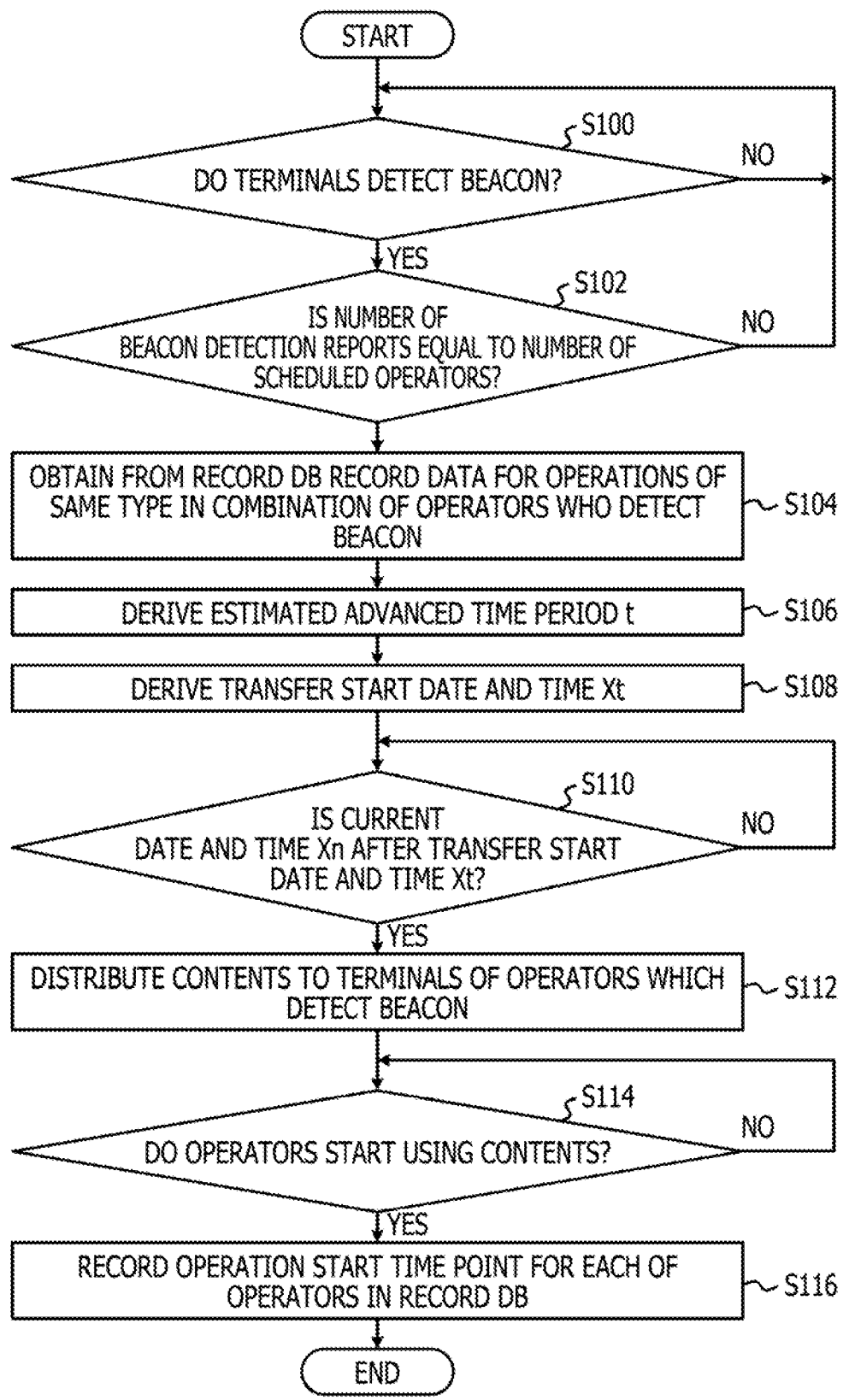
FIG. 10 is a flowchart illustrating an example of contents management processing according to a third embodiment.

Subsequently, the contents management processing according to the embodiment is described with reference to FIG. 10. FIG. 10 is a flowchart illustrating an example of the contents management processing according to a third embodiment. In the contents management processing according to the third embodiment, the case is described where calculation of the distribution timing of the contents is executed at a point of time at which the terminal devices 20 of all the operators scheduled to participate notify the information processing device 10 of that the beacon is detected.

When the main processing is started, the operation schedule search unit 11 determines whether or not the terminal devices 20 of the operators detect the beacon (step S100). When it is determined that the beacon is not detected, the processing returns to step S100. When it is determined that the beacon is detected, the operation schedule search unit 11 determines whether or not the number of beacon detection reports (the number of terminal device 20 which report the detection of the beacon) is equal to the number of all the operators scheduled to participate (step S102). When it is determined that the number of beacon detection reports is not equal to the number of all the operators scheduled to participate, the processing returns to step S100, and the processing of steps S100 and S102 is repeated.

When it is determined that the number of beacon detection reports is equal to the number of all the operators scheduled to participate, the distribution timing calculation unit 13 searches the record DB 17 and obtains the record data for the operations of the same type in which the operators of the terminal devices 20 which report the detection of the beacon participated (step S104). Subsequently, the distribution timing calculation unit 13 substitutes the obtained record data into Formula (1) and thereby calculates the estimated advanced time period t (step S106). Next, the distribution timing calculation unit 13 calculates the transfer start date and time Xt based on the calculated estimated advanced time period t (step S108).

Subsequently, the distribution timing calculation unit 13 determines whether or not the current date and time Xn is after the transfer start date and time Xt (step S110). The distribution timing calculation unit 13 repeats the processing of step S110 until it is determined that the current date and time Xn is after the transfer start date and time Xt. When it is determined that the current date and time Xn is after the transfer start date and time Xt, the distribution unit 14 distributes the contents to the terminal devices 20 of the operators which detect the beacon (step S112).

Subsequently, the reception unit 15 determines whether or not a notification is received that the operators to whom the contents are distributed start using the contents (step S114). The reception unit 15 repeats the processing of step S114 until a notification is received that the operators to whom the contents are distributed start using the contents. When the reception unit 15 determines that the operators to whom the contents are distributed start using the contents, the recording unit 16 records the operation start time point for each of the operators to whom the contents are distributed in the record DB 17 (step S116), and terminates the main processing.

As above, in the contents management processing according to the third embodiment, the estimated advanced time period t is calculated based on the past record temporal differences of the operators when all the participating operators enter the operation area. Then, the appropriate start timing of transferring the contents for operation is calculated corresponding to the estimated advanced time period t. Thus, in the embodiment, it is possible to distribute the contents at an appropriate timing to the terminal devices 20 of all the operators.

(Hardware Configuration)

Figure 11:
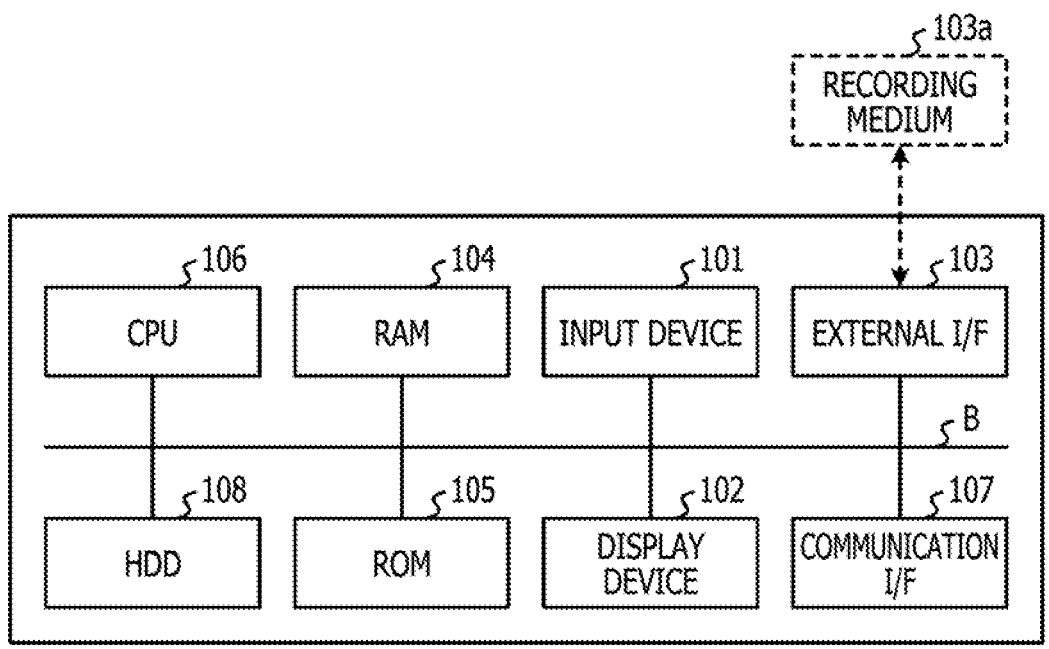
FIG. 11 is a diagram illustrating an example of a hardware configuration of an information processing device according to the embodiment.

In the end, a hardware configuration of the information processing device 10 according to the embodiment is described with reference to FIG. 11. FIG. 11 illustrates an example of the hardware configuration of the information processing device 10 according to the embodiment. The information processing device 10 includes an input device 101, a display device 102, an external I/F 103, a random access memory (RAM) 104, a read only memory (ROM) 105, a central processing unit (CPU) 106, a communication I/F 107, a hard disk drive (HDD) 108, and the like. These devices are coupled to one another via a bus B.

The input device 101 includes a keyboard and a mouse, and is used to input various operation signals to the information processing device 10. The display device 102 includes a display, and displays various processing results. The communication I/F 107 is an interface which couples the information processing device 10 to a network. This allows the information processing device 10 to communicate with the terminal device 20, the operation schedule management device 30, and the contents management server 40 via the communication I/F 107.

The HDD 108 is a non-volatile storage device which stores programs and data. The stored programs and data include basic software and application software which control the entire information processing device 10. For example, the HDD 108 may store various databases, programs, and the like.

The external I/F 103 is an interface with an external device. The external device includes a recording medium 103a, for example. This allows the information processing device 10 to read from or write onto the recording medium 103a via the external I/F 103. The recording medium 103a includes a compact disk (CD), a digital versatile disk (DVD), an SD memory card, a Universal Serial Bus memory (USB memory), and the like.

The ROM 105 is a non-volatile semiconductor memory (storage device) which is capable of retaining internal data even if the power is off. The ROM 105 stores programs and data for network settings and the like. The RAM 104 is a volatile semiconductor memory (storage device) which temporarily retains programs and data. The CPU 106 is a processing device which loads programs and data from the storage devices described above (for example, "HDD 108" and "ROM 105") onto the RAM 104 and executes processing, thereby controlling the entire device and achieving the installed functions.

In the above configuration, the CPU 106 of the information processing device 10 according to the embodiment executes the contents management processing using data and a contents management program stored in the ROM 105 and the HDD 108.

Note that information stored in the record DB 17, the operation spot DB 34, the operation schedule DB 35, and the contents DB 50 may be stored in a server and the like on a cloud coupled to the information processing device 10 via the RAM 104, the HDD 108, or the network.

The information processing device, the method of managing the contents, and the contents management program have been described above using the aforementioned embodiments. It is to be noted that the information processing device, the method of managing contents, and the contents management program according to the disclosure are not limited to the aforementioned embodiments, and various modifications and improvements are possible within the scope of the disclosure. In addition, in the case where there are two or more embodiments and modifications, these may be combined in a consistent manner.

For example, it is a matter of course that the configuration of the contents distribution system according to the embodiments is an example and thus does not impose limitation on the scope of the disclosure, and that various system configuration examples are available depending on the usage and purpose. For example, the operation schedule management device 30 and the information processing device 10 may be integrated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a processor configured to receive, for each user of each terminal device of a plurality of users of a plurality of terminal devices, an execution time point indicating a time point at which an operation is executed by the user; and
   a memory configured to store, for the user, difference information indicating a difference, between the execution time point and a first schedule time point indicating a time point at which the user is scheduled to execute the operation,
   wherein the processor is configured to,
      when detected that the terminal device carried by the user enters a region, specify from the memory the difference corresponding to the user,
      specify a timing at which content data used for the operation is to be transmitted to the terminal device, based on the difference corresponding to the user in the difference information and a second schedule time point indicating an estimated time point at which the operation is estimated to be executed by the user, and
      transmit the content data to the terminal device of the user at the specified timing.

2. The information processing device according to claim 1, wherein
   to detect that the terminal device carried by the user enters the region, the processor is configured to specify a timing when the terminal device carried by the user enters the region.

3. The information processing device according to claim 2, wherein
   the processor is configured to specify the timing when the terminal device carried by the user enters the region based on differences in the difference information which correspond respectively to the plurality of users.

4. The information processing device according to claim 3, wherein
   the processor is configured to specify the timing when the terminal device carried by the user enters the region based on the differences except differences exceeding a threshold value.

5. A method by an information processing device, comprising:
   receiving, for each user of each terminal device of a plurality of users of a plurality of terminal devices, an execution time point indicating a time point at which the operation is executed by the user;
   when detected that the terminal device carried by the user enters a region, specifying a difference corresponding to the user in stored difference information of differences corresponding respectively to the plurality of users, the difference indicating a difference between the execution time point and a first schedule time point indicating a time point at which the user is scheduled to execute the operation;
   specifying a timing at which content data used for the operation is to be transmitted to the first terminal device, based on the difference corresponding to the user and a second schedule time point indicating an estimated time point at which the operation is estimated to be executed by the first user; and
   transmitting the content data to the terminal device of the user at the specified timing.

6. The method according to claim 5, wherein
   to detect that the terminal device carried by the user enters the region, includes specifying a timing when the terminal device carried by the user enters the region.

7. The method according to claim 6, wherein the specifying of the timing when the terminal device carried by the user enters the region is based on the differences in the difference information which correspond respectively to the plurality of users.

8. The method according to claim 7, wherein
   the specifying the timing when the terminal device carried by the user enters the region is based on the differences except differences exceeding a threshold value.

9. A non-transitory computer-readable storage medium storing a program that causes an information processing apparatus to execute a process, the process comprising:
   receiving, for each user of each terminal device of a plurality of users of a plurality of terminal devices, an execution time point indicating a time point at which the operation is executed by the user;
   when detected that the terminal device carried by the user enters a region, specifying a difference corresponding to the user in stored difference information of differences corresponding respectively to the plurality of users, the difference indicating a difference between the execution time point and a first schedule time point indicating a time point at which the user is scheduled to execute the operation;
   specifying a timing at which content data used for the operation is to be transmitted to the first terminal device, based the difference corresponding to the and a second schedule time point indicating an estimated time point at which the operation is estimated to be executed by the user; and
   transmitting the content data to the terminal device of the user at the specified timing.

10. The non-transitory computer-readable storage medium according to claim 9, wherein
    to detect that the terminal device carried by the user enters the region, includes specifying a timing when the terminal device carried by the user enters the region.

11. The non-transitory computer-readable storage medium according to claim 10, wherein
    the specifying of the timing when the terminal device carried by the user enters the region is based on the differences in the difference information which correspond respectively to the plurality of users.

12. The non-transitory computer-readable storage medium according to claim 11, wherein
    the specifying the timing when the terminal device carried by the user enters the region is based on the differences except differences exceeding a threshold value.

* * * * *